US006523407B1

(12) United States Patent
Breese

(10) Patent No.: US 6,523,407 B1
(45) Date of Patent: Feb. 25, 2003

(54) APPARATUS AND METHOD FOR BALANCING A VEHICULAR DRIVESHAFT

(75) Inventor: Douglas E. Breese, Northwood, OH (US)

(73) Assignee: Torque-Traction Technologies, Inc., Toledo, OH (US)

( * ) Notice: Subject to any disclaimer, the term of this patent is extended or adjusted under 35 U.S.C. 154(b) by 0 days.

(21) Appl. No.: 09/643,415

(22) Filed: Aug. 22, 2000

Related U.S. Application Data
(60) Provisional application No. 60/151,785, filed on Aug. 31, 1999.

(51) Int. Cl.[7] ................................................. G01M 1/22
(52) U.S. Cl. ....................................................... 73/457
(58) Field of Search ........................... 73/462, 487, 457, 73/464, 466, 467, 66; 301/5.21, 5.22; 702/56

(56) References Cited

U.S. PATENT DOCUMENTS

| | | | | |
|---|---|---|---|---|
| 3,482,075 A | | 12/1969 | Wilde ........................ 219/121 |
| 3,538,298 A | | 11/1970 | Duston et al. | |
| 4,258,246 A | | 3/1981 | Karube et al. .............. 219/121 |
| 4,377,946 A | * | 3/1983 | Donato ......................... 73/457 |
| 4,773,019 A | | 9/1988 | Martin et al. .......... 219/121.68 |
| 5,189,912 A | | 3/1993 | Quinlan et al. ............... 73/462 |
| 5,827,964 A | * | 10/1998 | Douine et al. ................ 73/466 |
| 5,915,274 A | * | 6/1999 | Douglas ....................... 73/462 |
| 6,069,966 A | * | 5/2000 | Jones et al. ................... 73/146 |

* cited by examiner

Primary Examiner—Helen Kwok
(74) Attorney, Agent, or Firm—MacMillan, Sobanski & Todd, LLC

(57) ABSTRACT

An apparatus for quickly and efficiently balancing an article includes a pair of supports that are adapted to engage and support the ends of the driveshaft tube and to effect selective rotational and axial movement thereof. A system is provided for generating a representation of the shape of the outer surface of the driveshaft tube, such as by using a laser stripe generator and a digital camera. The laser stripe generator projects a relatively thin line of visible light onto the outer surface of the driveshaft tube. The digital camera receives the relatively thin visible line of light as it is reflected from the outer surface of the driveshaft tube and digitizes the reflected image into electrical signals. The apparatus further includes a system for generating a representation of the wall thickness of the driveshaft tube, such as by using an ultrasonic transducer. The signals from the digital camera and the ultrasonic transducer are fed to an electronic controller, which correlates such signals to generate an electronic three dimensional representation of the physical shape of the driveshaft tube. By summing all of such correlations together for the entire outer surface of the driveshaft tube, an electronic three dimensional representation of the physical shape of the driveshaft tube can be generated. The electronic controller then generates a mass or weight distribution representation of the driveshaft tube which can be analyzed to determine where imbalances are present. Based upon these calculations, the electronic controller can further determine the size and position of the balance weights to be secured to the driveshaft tube to counterbalance these imbalances. Such size and position information can be relayed to an operator in any conventional manner using an output device.

18 Claims, 2 Drawing Sheets

APPARATUS AND METHOD FOR BALANCING A VEHICULAR DRIVESHAFT

CROSS REFERENCE TO RELATED APPLICATION

This application claims the benefit of U.S. Provisional Application No. 60/151,785, filed Aug. 31, 1999, the disclosure of which is incorporated herein by reference.

BACKGROUND OF THE INVENTION

This invention relates in general to an apparatus and method for balancing an article, such a tube for use in a vehicular driveshaft assembly, for rotation about an axis. More specifically, this invention relates to an apparatus and method for automatically balancing such an article for rotation about an axis using digital imaging and ultrasonic thickness measuring techniques.

In most rear wheel drive vehicles, a source of rotational energy, such as an internal combustion or diesel engine, is located near the front of the vehicle. The engine is connected by means of a driveshaft assembly to rotate one or more driven wheels, which are located near the rear of the vehicle. The driveshaft assembly typically extends between an output shaft of a transmission, which is connected to and rotatably driven by the engine, and an input shaft of a differential, which is connected to rotatably drive the driven wheels. In some vehicles, the distance separating the transmission and the differential is relatively short. In these vehicles, the driveshaft assembly can be formed from a single, relatively long driveshaft tube having first and second universal joints that connect the ends of the driveshaft tube to the output shaft of the transmission and the input shaft of the differential. In other vehicles, the distance separating the transmission and the differential is relatively long, making the use of a single driveshaft impractical. In these vehicles, the driveshaft assembly can be formed from a plurality (typically two) of separate, relatively short driveshaft tubes. The driveshaft tubes are connected together by a first universal joint, and second and third universal joints are provided to connect the ends of the driveshaft tubes to the output shaft of the transmission and the input shaft of the differential.

Ideally, each of the driveshaft tubes would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tubes usually contain variations in roundness, straightness, and wall thickness that result in minor imbalances when rotated at high speeds. To prevent such imbalances from generating undesirable noise or vibration when rotated during use, therefore, it is commonplace to counteract such imbalances by securing balance weights to selected portions of the driveshaft tube. The balance weights are sized and positioned to counterbalance the imbalances of the driveshaft tube such that it is balanced for rotation during use.

Traditionally, the balancing process has been performed through the use of a conventional balancing machine. The balancing machine includes a pair of fittings that are adapted to support the ends of the driveshaft tube thereon. The balancing machine further includes a motor for rotating the driveshaft tube at a predetermined speed. As the driveshaft tube is rotated, the balancing machine senses vibrations that are caused by imbalances in the structure of the driveshaft tube. The balancing machine is responsive to such vibrations for determining the size and location of one or more balance weights that, if secured to the driveshaft, will minimize these imbalances. The rotation of the driveshaft tube is then stopped to allow such balance weights to be secured to the outer surface of the driveshaft tube in a conventional manner, such as by welding, adhesives, and the like. The driveshaft tube is again rotated to confirm whether proper balance has been achieved or to determine if additional balance weights are required. A number of such balancing machines of this general structure and method of operation are known in the art.

Although such prior art balancing machines have been effective, this balancing process has been found to be relatively slow and inefficient. This is because each driveshaft tube must usually be rotated and measured at least two times, a first time to measure the imbalances and determine the size and location of the balance weights, and a second time to confirm that proper balance has been achieved after the balance weights have been secured thereto. This time consuming process is particularly problematic in the context of balancing vehicular driveshaft tube, which are typically manufactured in relatively large volumes. Thus, it would be desirable to provide an improved apparatus and method for quickly and efficiently balancing an article, such a tube for use in a vehicular driveshaft assembly, for rotation about an axis.

SUMMARY OF THE INVENTION

This invention relates to an improved apparatus and method for quickly and efficiently balancing an article, such a tube for use in a vehicular driveshaft assembly, for rotation about an axis. The apparatus includes a pair of supports that are adapted to engage and support the ends of the driveshaft tube and to effect selective rotational and axial movement thereof. A system is provided for generating a representation of the shape of the outer surface of the driveshaft tube, such as by using a laser stripe generator and a digital camera. The laser stripe generator projects a relatively thin line of visible light onto the outer surface of the driveshaft tube. The digital camera receives the relatively thin visible line of light as it is reflected from the outer surface of the driveshaft tube and digitizes the reflected image into electrical signals. The apparatus further includes a system for generating a representation of the wall thickness of the driveshaft tube, such as by using an ultrasonic transducer. The signals from the digital camera and the ultrasonic transducer are fed to an electronic controller, which correlates such signals to generate an electronic three dimensional representation of the physical shape of the driveshaft tube. By summing all of such correlations together for the entire outer surface of the driveshaft tube, an electronic three dimensional representation of the physical shape of the driveshaft tube can be generated. The electronic controller then generates a mass or weight distribution representation of the driveshaft tube which can be analyzed to determine where imbalances are present. Based upon these calculations, the electronic controller can further determine the size and position of the balance weights to be secured to the driveshaft tube to counterbalance these imbalances. Such size and position information can be relayed to an operator in any conventional manner using an output device.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
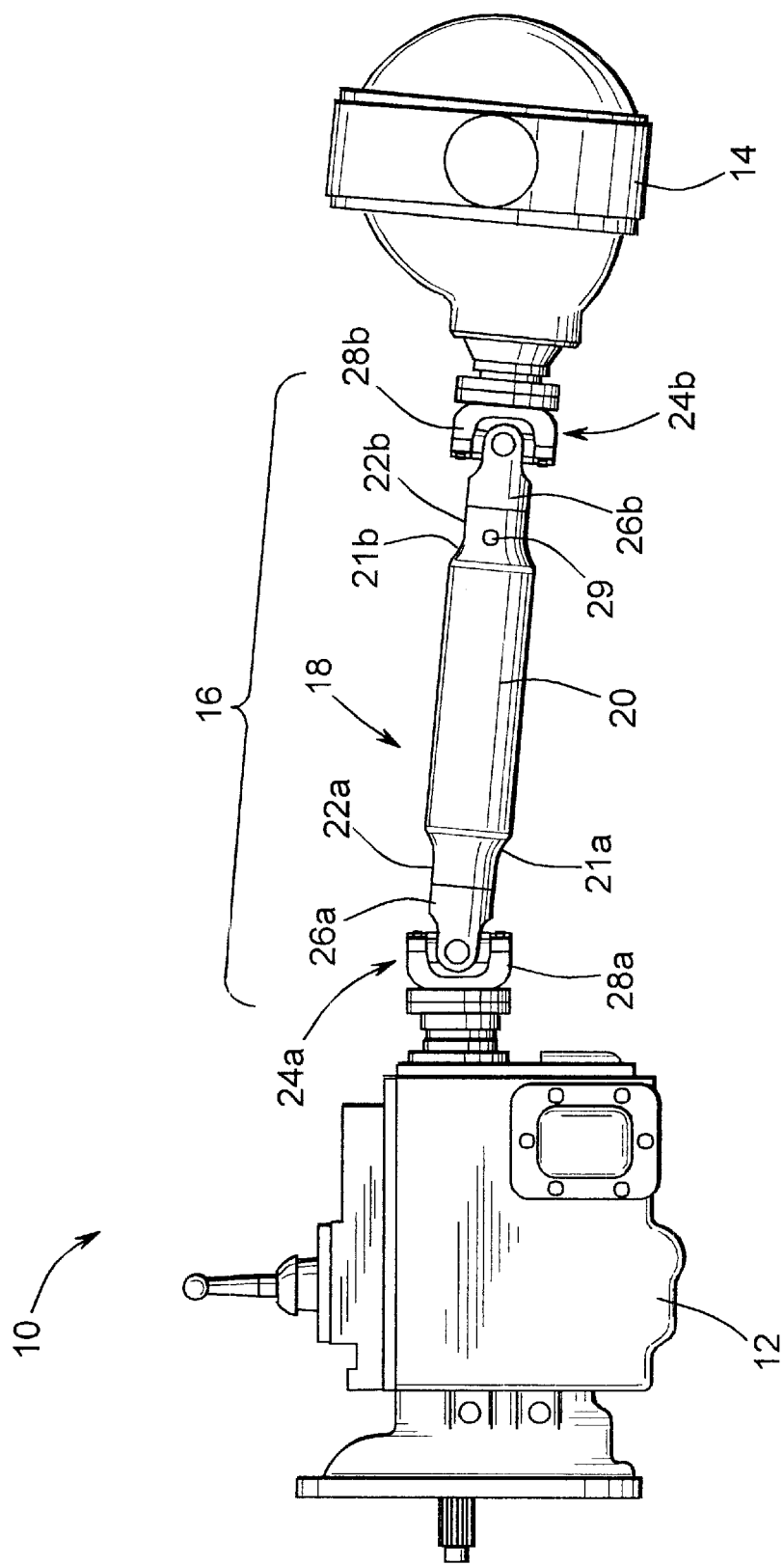
FIG. 1 is a side elevational view schematically illustrating a conventional vehicle drive train assembly including a driveshaft tube that can be balanced for rotation in accordance with the apparatus and method of this invention.

Referring now to the drawings, there is illustrated in FIG. 1 a vehicle drive train assembly, indicated generally at 10, that is generally conventional in the art. The drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a single, relatively long cylindrical driveshaft tube, indicated generally at 18, having a center portion 20 and a pair of opposed end portions 22a and 22b. The driveshaft tube 18 may be formed from any desired material, such as steel or aluminum. In the illustrated embodiment, the center portion 20 of the driveshaft tube 18 is formed having a larger outer diameter than either of the end portions 22a and 22b. Thus, respective transition regions 21a and 21b are defined between the larger diameter center portion 20 of the illustrated driveshaft tube 18 and each of the smaller diameter end portions 22a and 22b thereof. However, the driveshaft tube 18 may be formed having a constant diameter throughout the length thereof or any other desired shape. Alternatively, the single driveshaft tube 18 may be replaced by a compound driveshaft assembly (not shown) having separate first and second driveshaft tubes that are supported by a center bearing assembly between the transmission 12 and the axle assembly 14.

The output shaft of the transmission 12 and the input shaft of the axle assembly 14 are typically not co-axially aligned. To accommodate this, a pair of universal joints, indicated generally at 24a and 24b, are provided at the end portions 22a and 22b of the driveshaft tube 18 to respectively connect the driveshaft tube 18 to the output shaft of the transmission 12 and to the input shaft of the axle assembly 14. The first universal joint 24a includes a tube yoke 26a that is secured to the forward end portion 22a of the driveshaft tube 18 by any conventional means, such as by welding or adhesives. The first universal joint 24a further includes a half round end yoke 28a that is connected to the output shaft of the transmission 12. The second universal joint 24b includes a tube yoke 26b that is secured to the rearward end portion 22b of the driveshaft tube 18 by any conventional means, such as by welding or adhesives. The second universal joint 24b further includes a half round end yoke 28b that is connected to the input shaft of the axle assembly 14.

As is well known in the art, most driveshaft tubes, such as the driveshaft tube 18, usually contain variations in roundness, straightness, and wall thickness that result in minor imbalances when rotated at high speeds. To prevent such imbalances from generating undesirable noise or vibration, therefore, it is commonplace to counteract such imbalances by securing balance weights to selected portions of the driveshaft tube 18. Thus, as shown in FIG. 1, one or more balance weights, such as shown at 29, are secured to the outer surface of the driveshaft tube 18. The balance weights 29 are sized and positioned to counterbalance the imbalances of the driveshaft tube 18 such that the driveshaft assembly 16 is balanced for rotation during use. The manner in which the size and location of such balance weights is determined will be described in detail below. Any conventional means, such as welding, adhesives, and the like, can be used to secure the balance weights 29 to the driveshaft tube 18.

Figure 2:
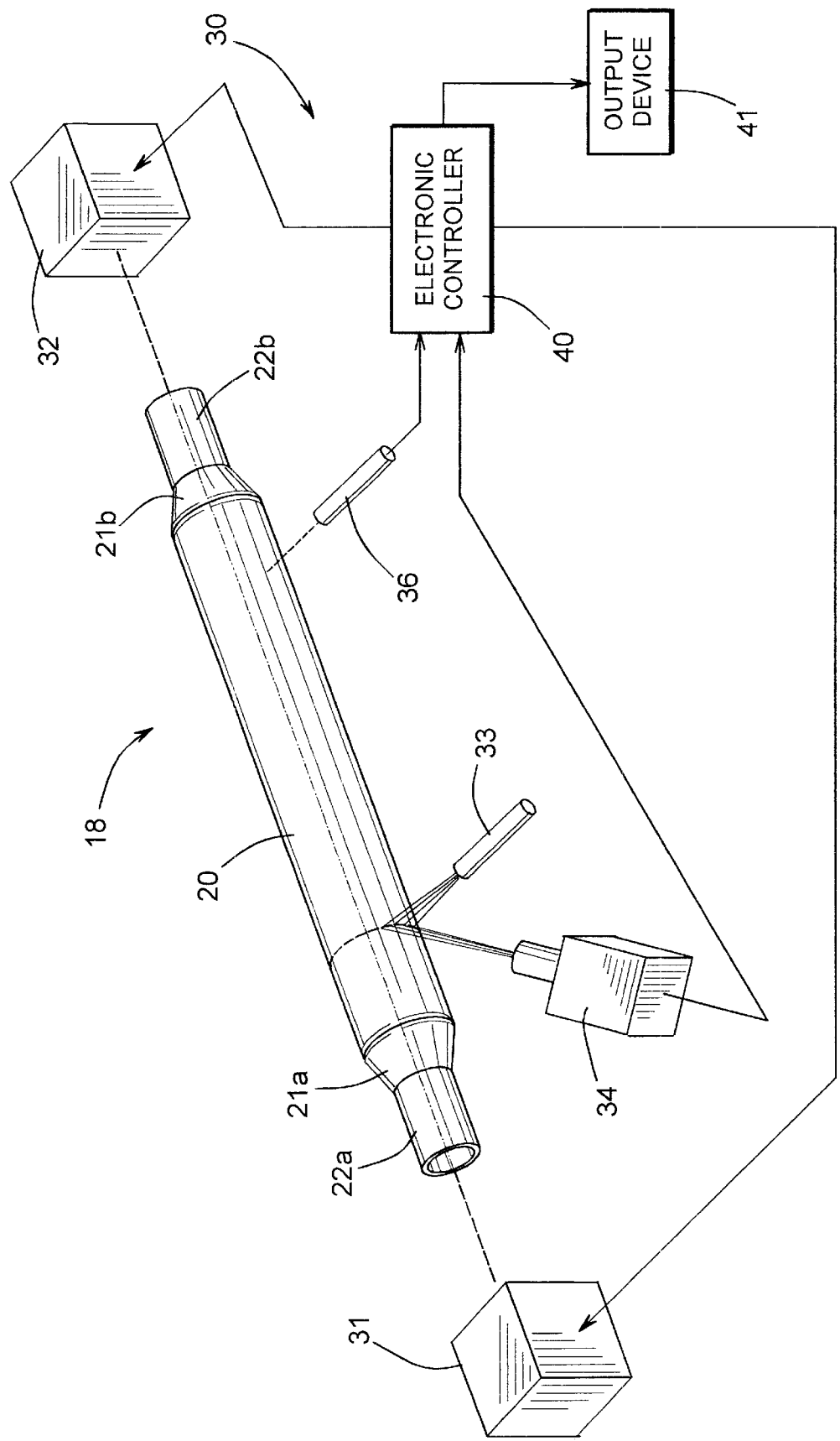
FIG. 2 is a perspective view of an apparatus for rotationally balancing the driveshaft tube illustrated in FIG. 1 using digital imaging and ultrasonic thickness measuring techniques in accordance with this invention.

Referring now to FIG. 2, there is illustrated an apparatus, indicated generally at 30, for rotationally balancing the driveshaft tube 18 illustrated in FIG. 1 in accordance with this invention. The apparatus 30 includes a pair of supports 31 and 32 that are adapted to engage and support the ends of the driveshaft tube 18. In the illustrated embodiment, the supports 31 and 32 are adapted to directly engage and support the end portions 22a and 22b of the driveshaft tube 18. However, it is contemplated that the supports 31 and 32 may engage the yokes 26a and 26b secured to the end portions 22a and 22b of the driveshaft tube 18, or alternatively the yokes 28a and 28b of the universal joints 24a and 24b respectively connected to the yokes 26a and 26b. As will be explained further below, the supports 31 and 32 can be adapted to effect selective rotational and axial movement of the driveshaft tube 18.

The apparatus 30 also includes a system for generating a representation of the shape of the outer surface of the driveshaft tube 18. In the illustrated embodiment, a process known as Laser Stripe Triangulation is used to generate a digital image of the shape of the outer surface of the driveshaft tube 18. To accomplish this, the apparatus 30 includes a laser stripe generator 33 and a digital camera 34. The laser stripe generator 33 is conventional in the art and is adapted to project a relatively thin line of visible light onto the outer surface of the driveshaft tube 18. Laser stripe generators 33 of this general type are commercially available, such as from 3D Scanners, Ltd. of England. The digital camera 34 is also conventional in the art and is adapted to receive the relatively thin visible line of light as reflected thereto from the outer surface of the driveshaft tube 18. Digital cameras 34 of this general type are widely available in the market. Preferably, the digital camera 34 is oriented at an angle relatively to the longitudinal axis of the driveshaft tube 18, as shown in FIG. 2, such that variations in the shape of the outer surface of the driveshaft tube 18 can be easily detected. The digital camera 34 digitizes the reflected image into electrical signals in a well known manner. Thus, the electronic signals generated by the digital camera 34 are representative of the shape of the portion of the outer surface of the driveshaft tube 18 illuminated by the laser stripe generator 33. By causing the driveshaft tube 18 to rotate and move axially relative to the laser stripe generator 33 and the digital camera 34, an electronic representation of the shape of the entire outer surface of the driveshaft tube 18 (or any desired portion thereof, if desired) can be generated.

In the illustrated embodiment, the supports 31 and 32 are used to rotatably and axially move the driveshaft tube 18 relative to the stationary laser stripe generator 33 and the digital camera 34. It will be appreciated, however, that either or both of the laser stripe generator 33 and the digital camera 34 may be moved relative to the stationary driveshaft tube 18 if desired. For example, the supports 31 and 32 may be used to effect rotational movement of the driveshaft tube 18, while the laser stripe generator 33 and the digital camera 34 may be moved axially relative thereto. Furthermore, it is contemplated that other structures, such as, for example, mechanical, electromagnetic, inductive, acoustical, non-contact proximity sensing devices, and the like may be used to generate a representation of the shape of the outer surface of the driveshaft tube 18. Lastly, in order to reduce the amount of time required to generate the representation of the shape of the outer surface of the driveshaft tube 18, a plurality of laser stripe generators 33 and digital cameras 34 may be used to simultaneously scan different portions of the outer surface of the driveshaft tube 18.

The apparatus 30 further includes a system for generating a representation of the wall thickness of the driveshaft tube 18. In the illustrated embodiment, a conventional ultrasonic transducer 36 is provided for generating an electrical signal that is representative of the wall thickness of the driveshaft tube 18 at a given location thereof. The ultrasonic transducer 36 and the driveshaft tube 18 can be moved relative to one another in the same manner as described above such that an electronic representation of the wall thickness of the entire driveshaft tube 18 (or any desired portion thereof, if desired) can be generated. As suggested from the above discussion, it is contemplated that other structures, such as, for example, mechanical, electromagnetic, and acoustical sensing devices, and the like may be used to generate a representation of the wall thickness of the driveshaft tube 18, and further that a plurality of such ultrasonic transducers 36 may be used to simultaneously scan different portions of the driveshaft tube 18. Ultrasonic transducers 36 of this general type are commercially available, such as from NDT International, Inc. of Canada.

The signals from the digital camera 33 and the ultrasonic transducer 36 are fed to an electronic controller 40. The electronic controller 40 is conventional in the art and may, for example, be embodied as a conventional microprocessor. The electronic controller 40 correlates the signals from the digital camera 33 (which are representative of the shape of the outer surface of the driveshaft tube 18) with the signals from the ultrasonic transducer 36 (which are representative of the wall thickness of the driveshaft tube 18) to generate an electronic three dimensional representation or image of the physical shape of the driveshaft tube 18. This can be accomplished by associating the shape of the outer surface of the driveshaft tube 18 at a given location with the wall thickness at that location. As a result, the location of the inner surface of the driveshaft tube 18 at point can be determined. By summing all of such correlations for the entire outer surface of the driveshaft tube 18, an electronic three dimensional representation or image of the physical shape of the driveshaft tube 18 can be generated. It may be necessary or desirable for the electronic controller 40 to control the operation of the supports 31 and 32 so as to maintain control over the scanning processes. All of this can be accomplished using conventional programming techniques for the electronic controller 40 that are well known the art. Alternatively, only selected discrete portions of the driveshaft tube 18 can be scanned and sampled in accordance with the method described above. The interim portions of the driveshaft tube 18 that are not scanned can be approximated by the electronic controller 40 using conventional programming techniques. Thus, this invention does not require complete scanning of the entire driveshaft tube 18 to be effective.

Having generated an electronic three dimensional representation of the physical shape of the driveshaft tube 18, the electronic controller 40 can then calculate a representation of the mass or weight distribution thereof. If desired, the electronic controller 40 can be programmed with information regarding the nature of the specific driveshaft tube 18 to be balanced, such as the nature or weight density of the material used to form the driveshaft tube 18. Regardless, the electronic controller 40 analyzes the representation of the mass or weight distribution to determine where imbalances are located in the driveshaft tube 18. Based upon these calculations, the electronic controller 40 can further determine the size and position of the balance weight or weights 29 to be secured to the driveshaft tube 18 to counterbalance these imbalances. Such size and position information can be relayed to an operator in any conventional manner using an output device 41, such as a visual display, connected to the electronic controller 40. Alternatively, the output device 41 may be embodied as a marking device that is adapted to generate a mark or other visual indication directly on the driveshaft tube 18 at the location or locations where the balance weights 29 are to be attached. The nature of such visual indications can be varied to reflect differing sizes of balance weights 29 to be attached. In any event, when the balance weights 29 are subsequently secured to the driveshaft tube 18 in a known manner, such as by welding, adhesives, and the like, the driveshaft tube 18 will be balanced for rotation during use.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for determining imbalances in an article adapted for rotation comprising:

a system for generating signals that are representative of a shape of an outer surface of the article;

a system for generating signals that are representative of a wall thickness of the article;

a controller responsive to said outer surface shape signals and said wall thickness signals for determining imbalances in the article.

2. The apparatus defined in claim 1 wherein said system for generating signals that are representative of the shape of the outer surface of the article includes a device for generating a beam of light against the outer surface of the article and a device that is responsive to light reflected from the outer surface of the article for generating signals that are representative of the shape of the outer surface of the article.

3. The apparatus defined in claim 2 wherein said device for generating a beam of light against the outer surface of the article includes a laser.

4. The apparatus defined in claim 2 wherein said device for generating a beam of light against the outer surface of the article includes a laser that projects a relatively thin line of visible light onto the outer surface of the article.

5. The apparatus defined in claim 2 wherein said device that is responsive to light reflected from the outer surface of the article includes a camera.

6. The apparatus defined in claim 2 wherein said device that is responsive to light reflected from the outer surface of the article includes a digital camera.

7. The apparatus defined in claim 1 wherein said system for generating signals that are representative of the wall thickness of the article includes an ultrasonic transducer.

8. The apparatus defined in claim 1 further including supports for supporting ends of the article.

9. The apparatus defined in claim 8 wherein said supports are capable of effecting movement of the article relative to at least one of said system for generating signals that are representative of the shape of the outer surface of the article and said system for generating signals that are representative of the wall thickness of the article.

10. The apparatus defined in claim 9 wherein said supports are capable of effecting movement of the article relative to both of said system for generating signals that are representative of the shape of the outer surface of the article and said system for generating signals that are representative of the wall thickness of the article.

11. The apparatus defined in claim 1 wherein said controller includes an electronic controller.

12. The apparatus defined in claim 1 wherein said controller includes an output device.

13. The apparatus defined in claim 12 wherein said output device is a visual display.

14. The apparatus defined in claim 12 wherein said output device generates a visual indication on the article at the locations of the imbalances.

15. A method of balancing an unbalanced article for rotation comprising the steps of:
   (a) generating a representation of a shape of an outer surface of the article;
   (b) generating a representation of a wall thickness of the article;
   (c) correlating the representations of the shape of the outer surface of the article and the wall thickness of the article to determine imbalances in the article; and
   (d) securing a balance weight to the article to balance the article for rotation.

16. The method defined in claim 15 wherein said step (a) is performed by generating a beam of light against the outer surface of the article and receiving light reflected from the outer surface of the article.

17. The method defined in claim 15 wherein said step (b) is performed by an ultrasonic transducer.

18. The method defined in claim 15 wherein said step (d) is performed by an electronic controller.

* * * * *